United States Patent
Dimitrovski et al.

(10) Patent No.: US 12,057,963 B2
(45) Date of Patent: Aug. 6, 2024

(54) CONNECTING TO A HOME AREA NETWORK VIA A MOBILE COMMUNICATION NETWORK

(71) Applicants: KONINKLIJKE KPN N.V., Rotterdam (NL); NEDERLANDSE ORGANISATIE VOOR TOEGEPAST-NATUURWETENSCHAPPELIJK ONDERZOEK TNO, s-Gravenhage (NL)

(72) Inventors: Toni Dimitrovski, The Hague (NL); Miodrag Djurica, Rotterdam (NL); Sander De Kievit, Tokyo (JP); Antonius Norp, The Hague (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 17/274,561

(22) PCT Filed: Sep. 9, 2019

(86) PCT No.: PCT/EP2019/073946
§ 371 (c)(1),
(2) Date: Mar. 9, 2021

(87) PCT Pub. No.: WO2020/053126
PCT Pub. Date: Mar. 19, 2020

(65) Prior Publication Data
US 2022/0060350 A1 Feb. 24, 2022

(30) Foreign Application Priority Data
Sep. 10, 2018 (EP) ..................................... 18193370

(51) Int. Cl.
*H04L 12/28* (2006.01)
*H04W 76/12* (2018.01)
*H04W 88/16* (2009.01)

(52) U.S. Cl.
CPC ......... *H04L 12/2834* (2013.01); *H04W 76/12* (2018.02); *H04W 88/16* (2013.01)

(58) Field of Classification Search
CPC .... H04L 12/2834; H04W 76/12; H04W 88/16
See application file for complete search history.

(56) References Cited

U.S. PATENT DOCUMENTS

| 2008/0198858 | A1* | 8/2008 | Townsley | H04L 61/2535 |
| | | | | 370/392 |
| 2009/0113073 | A1* | 4/2009 | Koide | H04L 12/4633 |
| | | | | 709/245 |

(Continued)

FOREIGN PATENT DOCUMENTS

| AU | 2009248846 A1 * | 11/2009 | ............. H04L 47/10 |
| CA | 2940731 C * | 8/2020 | .......... H04L 61/1511 |
| JP | 2004528761 A * | 9/2004 | |

OTHER PUBLICATIONS

Combined PCT Search Report and Written Opinion, PCT App. No. PCT/EP2019/073946, mailed Mar. 3, 2020, 19 pages.

(Continued)

*Primary Examiner* — Saad A. Waqas
(74) *Attorney, Agent, or Firm* — McDonnell Boehnen Hulbert & Berghoff LLP

(57) ABSTRACT

The system of the invention is configured to receive from a client device (41) located in the mobile communication network (1) a request to connect to a home area network (5), determine an identifier of a residential gateway (61) in the home area network or of a fixed-line network (3) to which the home area network is coupled, and transmit a request for an address and a range of addresses in the home area (Continued)

network to the residential gateway or the fixed-line network corresponding to the determined identifier. The system is further configured to receive the address and the range of addresses from the residential gateway or the fixed-line network, transmit the address to the client device, establish a tunnel with the residential gateway and establish a forwarding rule at a forwarding function (15) of the mobile communication network.

18 Claims, 8 Drawing Sheets

(56) References Cited

U.S. PATENT DOCUMENTS

| | | | |
|---|---|---|---|
| 2010/0125899 A1* | 5/2010 | Tinnakornsrisuphap | H04W 92/02 709/206 |
| 2013/0103833 A1* | 4/2013 | Ringland | H04W 80/04 709/224 |
| 2013/0227660 A1* | 8/2013 | Murakami | H04L 63/08 726/5 |

OTHER PUBLICATIONS

"3rd Generation Partnership Project; Technical Specification Group Services and System Aspects; Network Architecture (release 15)". 3GPP TS 23.002. V15.0.0. (Mar. 2018), 115 pages.

3rd Generation Partnership Project; Technical Specification Group Services and System Aspects; General Packet Radio Service (GPRS) enhancements for Evolved Universal Terrestrial Radio Access Network (E-UTRAN) access (Release 16). 3GPP TS 23.401. V16.0.0. (Sep. 2018), 410 pages.

"3rd Generation Partnership Project; Technical Specification Group Services and System Aspects; System Architecture for the 5G System; Stage 2 (Release 15)". 3GPP TS 23.501. V15.2.0. (Jun. 2018), 217 pages.

"3rd Generation Partnership Project; Technical Specification Group Services and System Aspects; Generic Authentication Architecture (GAA); Generic Bootstrapping Architecture (GBA) (Release 17)". 3GPP TS 33.220. V17.0.0. (Dec. 2020), 95 pages.

"Network Enhanced Residential Gateway". Broadband Forum, Technical Report. TR-317. Issue: 1. Issue Date: Jul. 2016, 67 pages.

Chinese Office Action in Chinese Paten Application No. 201980072971.8 issued Jun. 28, 2022.

* cited by examiner

CONNECTING TO A HOME AREA NETWORK VIA A MOBILE COMMUNICATION NETWORK

CROSS REFERENCE TO RELATED APPLICATIONS

The present application is a national stage entry of, and claims priority to, PCT/EP2019/073946, filed on Sep. 6, 2019, which claims priority to European Patent Application EP 18193370.6, filed in the European Patent Office on Sep. 10, 2018, both of which are hereby incorporated in their entirety herein by reference.

FIELD OF THE INVENTION

The invention relates to a system for receiving a request to connect to a home area network, a client device for transmitting a request to connect to a home area network and a residential gateway for establishing a connection with a home area network.

The invention further relates to a method of receiving a request to connect to a home area network, a method of transmitting a request to connect to a home area network and a method of establishing a connection with a home area network.

The invention also relates to a computer program product enabling a computer system to perform such methods.

BACKGROUND OF THE INVENTION

The growth of the number of things connected to the Internet is picking up pace. Last hop connectivity technologies are trying to take advantage of this growth and provide the most optimal setup. Examples of such devices are electricity smart meters, light controllers, and heating controllers. They are usually placed in the home and the reason for them being connected to the Internet is either to send pieces of data to a processing server or to be remote controlled over the Internet. Other home applications may include an application where a user sends data to a printer on the LAN and an application where a user synchronizes large media files with a media server connected to the LAN, for example.

All home devices are usually connected to the Internet via a device called Residential Gateway (RGw; sometimes referred to as Home Gateway). The RGw is the device that assigns IP addresses to other home devices and routes packets in and out of the home private domain, i.e. the home area network. The meaning of "private domain" in this case is that this network is in most cases inaccessible from the outside world. In the case of IPv4 the RGw assigns IP addresses from a private range which are not routable via the Internet.

In order to connect to the Internet, the RGw acts as a Network Address Translation (NAT) device and translates the source address of each home device to one or more public IP addresses. Devices in these networks are therefore not directly reachable by devices residing outside of these networks, apart from when complicated port forwarding rules or a so-called Virtual Private Network are set up. In the case of IPv6, there is no shortage of addresses, and therefore private addressing ranges are not strictly needed. All devices in the home could get a globally unique IP address that can be routable from the Internet. However, generally some kind of access control (firewalling) is enforced on the edge of the home area, i.e. in the RGw to protect the devices in the home area network. Although ways of connecting to a home area network (e.g. in order to reach and control smart home devices) while connected to a (public) mobile communication network do exist, they usually involve a big operational effort and they don't provide the user experience of a home connection.

SUMMARY OF THE INVENTION

It is a first object of the invention to provide a system for receiving a request to connect to a home area network, which can be used to provide the experience of a home connection to a user of a client device when it is not directly connected to its home area network.

It is a second object of the invention to provide a client device for transmitting a request to connect to a home area network, which can be used to provide the experience of a home connection to a user of the client device when it is not directly connected to its home area network.

It is a third object of the invention to provide a residential gateway for establishing a connection with a home area network, which can be used to provide the experience of a home connection to a user of a client device when it is not directly connected to its home area network.

It is a fourth object of the invention to provide a method of receiving a request to connect to a home area network, which can be used to provide the experience of a home connection to a user of a client device when it is not directly connected to its home area network.

It is a fifth object of the invention to provide a method of transmitting a request to connect to a home area network, which can be used to provide the experience of a home connection to a user of a client device when it is not directly connected to its home area network.

It is a sixth object of the invention to provide a method of establishing a connection with a home area network, which can be used to provide the experience of a home connection to a user of a client device when it is not directly connected to its home area network.

According to the invention, the first object is realized in that the system comprises at least one receiver, at least one transmitter, and at least one processor configured to use said at least one receiver to receive from a client device located in said mobile communication network a request to connect to a home area network, determine an identifier of a residential gateway in said home area network or of a fixed-line network to which said home area network is coupled, use said at least one transmitter to transmit a request for an address and a range of addresses in said home area network to said residential gateway or said fixed-line network corresponding to said determined identifier, use said at least one receiver to receive said address and said range of addresses from said residential gateway or said fixed-line network, use said at least one transmitter to transmit said address to said client device, use said at least one receiver and said at least one transmitter to establish a tunnel with said residential gateway, use said at least one transmitter to establish a forwarding rule at a forwarding function of said mobile communication network, said forwarding rule including said range of addresses and ensuring that data received from said client device and destined for a destination address in said range of addresses is forwarded to said residential gateway through said tunnel. Said at least one processor may be configured to receive a tunnel identifier relating to said established tunnel and include it in said forwarding rule to allow said data to be forwarded by said forwarding function.

The client device is located outside the home area network and is normally located inside the mobile communication network when transmitting said data. The addresses are IP addresses or Ethernet addresses, for example. The client device normally has a subscription with the mobile communication network, e.g. in the form of a SIM or UICC card. The residential gateway may comprise a single device or a plurality of devices. The residential gateway may comprise a Bridged Residential Gateway (BRG) in the home area network and a virtual Gateway (vG) in the fixed-line network, for example. The identifier may comprise an address, for example. Establishment of the tunnel may be initiated by the mobile communication network or by the residential gateway. The home area network may also be a local area network in an office, factory or other commercial building for example.

The inventors have recognized that by letting the mobile communication network establish a tunnel with the residential gateway of a user's home area network and split traffic into traffic destined for the home area network and other (e.g. Internet-destined) traffic, the mobile communication network can provide the experience of a home connection to the user when his client device is not directly connected to its home area network without the traffic destined for the home area network having to traverse the Internet and without the traffic destined for the Internet having to traverse the tunnel and the residential gateway, which is inefficient.

By letting the mobile communication network set up the tunnel and not the client device, additional security may be provided, as the mobile communication network is able to provide a verified client device identifier (e.g. an IMSI, IMEI or new device identifier). This prevents people from spoofing this client device identifier to get access to a home area network. Normally, there is a trust relationship between the mobile communication network one hand and the home area network and/or the fixed line network on the other hand and spoofing by the mobile communication network is not a risk in that case. The client device may provide a client device identifier known to the residential gateway, which is then verified by the mobile communication network, or the client device may not provide a client device identifier known to the residential gateway, which is then determined and provided by the mobile communication network. The residential gateway or the mobile communication network may refuse requests from an unauthorized client device based on the provided verified client device identifier.

Said address may be a private address (e.g. IP address) and said forwarding rule may ensure that said forwarding function replaces said address in said received data with a public address before transmitting said data to a destination address outside said range of addresses. Normally, residential gateways assign private IP addresses to devices in the home area network, for example because the number of IPv4 addresses is limited. Furthermore, as different residential gateways normally assign IP addresses in the same private ranges, it is beneficial to match a source IP address or tunnel identifier (e.g. a 5G Tunnelling Protocol tunnel identifier) to a public IP address per source.

Said at least one processor may be configured to obtain said identifier of said residential gateway from a database which associates identifiers of client devices with identifiers of residential gateways. This allows the system to determine which residential gateway is associated with a client device or to verify that a residential gateway identified by a client device is indeed associated with this client device.

Said at least one processor may be configured to use said at least one receiver to receive an identifier of said residential gateway from said client device, check whether an identifier of said client device is associated with said identifier of said residential gateway in said database and transmit said request for said address and said range of addresses in dependence on said identifier of said client device being associated with said identifier of said residential gateway. This prevents that a residential gateway can be flooded with requests from unauthorized client devices via the mobile communication network.

Said at least one processor may be configured to determine an association between an identifier of said client device and said identifier of said residential gateway based on information received from a network server and store said association in said database before receiving said request to connect to said home area network from said client device. This ensures that only authorized persons/client devices are able to access the home area network. The network server may be located in a fixed line network coupled to said home area network or in a combined fixed line and mobile communication network, for example. The client device may contact this network server with a token obtained from the home area network and the network server may then request the system to store the association. An alternative would be, for example, to allow an administrator of the residential gateway to provide telephone numbers of authorized client devices, which a mobile communication network could translate to IMSI identifiers.

According to the invention, the second object is realized in that the client device comprises at least one receiver, at least one transmitter, and at least one processor configured to use said at least one transmitter to transmit to a mobile communication network a request to connect to a home area network, use said at least one receiver to receive an address from a range of addresses used in said home area network from said mobile communication network, and use said at least one transmitter to transmit data destined for said home area network to said mobile communication network, said data comprising said received address as source address.

Said at least one processor may be configured to connect directly from within said home area network to a residential gateway, receive a token from said residential gateway and transmit to a network server a further request to register an association between said client device and said residential gateway before transmitting said request to said mobile communication network, said further request comprising said token. This self-provisioning phase ensures that only authorized persons/client devices are able to access the home area network. This may involve the use of Generic Bootstrapping Architecture (GBA) techniques, for example.

Said at least one processor may be configured to use said at least one receiver to receive an identifier of said residential gateway from said network server in response to said further request and include said identifier of said residential gateway in said request before transmitting said request.

According to the invention, the third object is realized in that the residential gateway comprises at least one receiver, at least one transmitter, and at least one processor configured to use said at least one receiver to receive a request for an address for a client device in said home area network and for a range of addresses allocated to said home area network, use said at least one transmitter to transmit a response to said request, said response comprising said address and said range of addresses, use said at least one receiver and said at least one transmitter to establish a tunnel with said mobile communication data network, and use said at least one receiver to receive data for said home area network from said client device via said tunnel Said at least one processor may be configured to obtain a token and provide said token to said client device when said client device is directly connected from within said home area network. The token may be obtained from the network server, may be generated by the residential gateway and then transmitted to the network server, or may be generated by a third server and then provided to both the residential gateway and network server. The intended result is that the token that the residential gateway provides to the client device is known to the network server and can be associated by the network server to the residential gateway.

According to the invention, the fourth object is realized in that the method of receiving a request to connect to a home area network comprises receiving from a client device located in said mobile communication network a request to connect to a home area network, determining an identifier of a residential gateway in said home area network or of a fixed-line network to which said home area network is coupled, transmitting a request for an address and a range of addresses in said home area network to said residential gateway or said fixed-line network corresponding to said determined identifier, receiving said address and said range of addresses from said residential gateway or said fixed-line network, transmitting said address to said client device, establishing a tunnel with said residential gateway, and establishing a forwarding rule at a forwarding function of said mobile communication network, said forwarding rule including said range of addresses and ensuring that data received from said client device associated with said tunnel identifier and destined for a destination address in said range of addresses is forwarded to said residential gateway through said tunnel. Said method may be performed by software running on a programmable device. This software may be provided as a computer program product.

According to the invention, the fifth object is realized in that the method of transmitting a request to connect to a home area network comprises transmitting to a mobile communication network a request to connect to a home area network, receiving an address from a range of addresses used in said home area network from said mobile communication network, and transmitting data destined for said home area network to said mobile communication network, said data comprising said received address as source address. Said method may be performed by software running on a programmable device. This software may be provided as a computer program product.

According to the invention, the sixth object is realized in that the method of establishing a connection with a home area network comprises receiving a request for an address for a client device in said home area network and for a range of addresses allocated to said home area network, transmitting a response to said request, said response comprising said address and said range of addresses, establishing a tunnel with said mobile communication data network, and receiving data for said home area network from said client device via said tunnel. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: receiving from a client device located in said mobile communication network a request to connect to a home area network, determining an identifier of a residential gateway in said home area network or of a fixed-line network to which said home area network is coupled, transmitting a request for an address and a range of addresses in said home area network to said residential gateway or said fixed-line network corresponding to said determined identifier, receiving said address and said range of addresses from said residential gateway or said fixed-line network, transmitting said address to said client device, establishing a tunnel with said residential gateway and receive a tunnel identifier relating to said established tunnel, and establishing a forwarding rule at a forwarding function of said mobile communication network, said forwarding rule including said tunnel identifier and said range of addresses and ensuring that data received from said client device associated with said tunnel identifier and destined for a destination address in said range of addresses is forwarded to said residential gateway through said tunnel.

A non-transitory computer-readable storage medium stores at least a second software code portion, the second software code portion, when executed or processed by a computer, being configured to perform executable operations comprising: transmitting to a mobile communication network a request to connect to a home area network, receiving an address from a range of addresses used in said home area network from said mobile communication network, and transmitting data destined for said home area network to said mobile communication network, said data comprising said received address as source address.

A non-transitory computer-readable storage medium stores at least a third software code portion, the second software code portion, when executed or processed by a computer, being configured to perform executable operations comprising: receiving a request for an address for a client device in said home area network and for a range of addresses allocated to said home area network, transmitting a response to said request, said response comprising said address and said range of addresses, establishing a tunnel with said mobile communication data network, and receiving data for said home area network from said client device via said tunnel.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
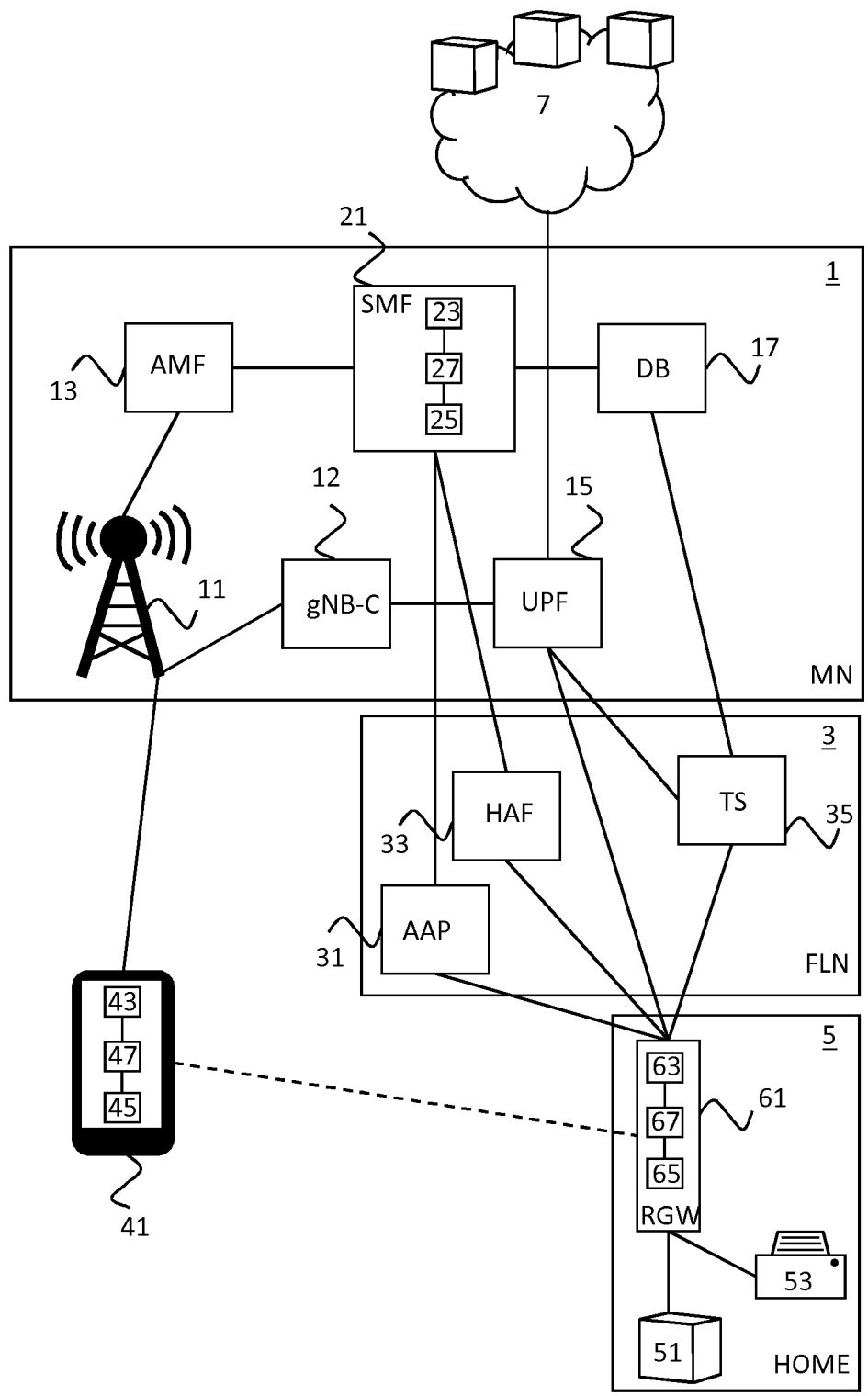
FIG. 1 is a block diagram showing first embodiments of the system, client device and residential gateway of the invention.

FIG. 1 shows first embodiments of the system, client device and residential gateway of the invention. In FIG. 1, the system of the invention is a Session Management Function (SMF) 21 of a 5G mobile communication network 1. In FIG. 1, the client device of the invention is a mobile device 41 (which is a type of User Equipment/UE in the context of a mobile communication network). The residential gateway of the invention is denoted by reference numeral 61. The residential gateway 61 is part of a home area network 5. The home area network 5 is coupled to a fixed line network 3. The fixed line network 3 is coupled to the mobile communication network 1.

Other functions of the 5G mobile communication network 1 that are relevant for describing the invention in more detail are depicted in FIG. 1 as well. The mobile communication network 1 of FIG. 1 further comprises a gNodeB-D 11, a gNodeB-C 12, an Access and Mobility Management Function (AMF) 13, a User Plane Function 15 and a database server 17. The database server 17 may be a Unified Data Management (UDM) function, for example. While the Radio Access Network (RAN) of an LTE network comprises eNodeB's, the RAN of a 5G mobile communication network comprises gNodeB's, i.e. next-generation eNodeB's. In particular, the RAN of a 5G mobile communication network may comprise central units, e.g. gNB-C 12 of FIG. 1, and distributed units, e.g. gNB-D 11, of FIG. 1.

In addition to the residential gateway 61, the home area network 5 may further comprise a PC 51 and a printer 53, which the user of the mobile device 41 may want to have access to. The mobile device 41 is normally part of the mobile communication network 1, i.e. connected to gNB-D 11, but is sometimes additionally or alternatively part of the home area network 5, i.e. connected to residential gateway 61. For this reason, the mobile device 41 is not included in the rectangle with reference numeral 1.

The home area network may also be a local area network in e.g. an office, factory, or other commercial building. The gateway between the local area network and the fixed line network is also referred to as residential gateway in this case.

The fixed line network 3 may be an xDSL, fiber-to-the-home, or wireless-local-loop network, for example. Functions of the fixed line network 3 that are relevant for describing the invention in more detail are depicted in FIG. 1. In the embodiment of FIG. 1, the fixed line network 3 comprises three new elements: an Address Assignment Proxy (AAP) 31, a Home Access Function (HAF) 33 and a Token Server (TS) 35. The function of the token server will be described in relation to FIG. 5.

The SMF 21 comprises a receiver 23, a transmitter 25 and a processor 27. The processor 27 is configured to use the receiver 23 to receive from the mobile device 41 located in the mobile communication network 1 a request to connect to the home area network 5, determine an identifier of the residential gateway 61 in the home area network 5, use the transmitter 23 to transmit via the AAP 31 a request for an address and a range of addresses in the home area network 5 to the residential gateway 61 corresponding to the determined identifier, use the receiver 23 to receive the address and the range of addresses from the residential gateway 61 via the AAP 31.

The identifier of the residential gateway 61 may be an IP address, a Uniform Resource Identifier (URI), DNS name or anything identifying the residential gateway 61 or anything translatable to an identifier of the residential gateway 61 by the database server 17, for example. The responsible AAP may be determined from the identifier of the residential gateway, for example. In an alternative embodiment, an identifier of the fixed line network 3 is obtained instead of an identifier of the residential gateway 61 and the address request is transmitted to the AAP. This will be described in more detail in relation to FIG. 2.

The processor 27 is further configured to use the transmitter 25 to transmit the address to the client device 41, use the receiver 23 and the transmitter 25 to establish a tunnel with the residential gateway 61 and receive a tunnel identifier relating to the established tunnel, and use the transmitter 25 to establish a forwarding rule at the UPF 15 of the mobile communication network 1. The forwarding rule includes the tunnel identifier and the range of addresses and ensures that data received from the mobile device 41 associated with the tunnel identifier and destined for a destination address in the range of addresses is forwarded to the residential gateway 61 through the tunnel.

In an alternative embodiment, the SMF 21 does not receive this tunnel identifier and instead of a tunnel identifier includes a residential gateway identifier or address in the forwarding rule. The UPF 15 determines the correct tunnel based on the data it receives from the mobile device 41, which does not include the tunnel identifier. For example, the UPF 15 determines which forwarding rule applies (the forwarding rule contains a filter to determine for which incoming traffic it applies). Then in the forwarding rule the UPF 15 finds the associated residential gateway. Then the residential gateway address or identifier determines which tunnel is used. If the residential gateway address is known, all incoming traffic is tunneled to that address. If only an identifier for the residential gateway is provided by the SMF 21, the UPF 15 will resolve this identifier in an address once and will then store the address.

In the embodiment of FIG. 1, the processor 27 is configured to transmit a tunnel request to the HAF 33 in the fixed line network 3, which then forwards the tunnel request to the residential gateway 61. The processor 27 is further configured to receive the tunnel identifier from the HAF 33. In the embodiment of FIG. 1, the address is a private address and the forwarding rule ensures that the UPF 15 replaces the address in the data received from the mobile device 41 with a public address before transmitting the data to a destination address outside the range of addresses.

The mobile device 41 comprise a receiver 43, a transmitter 45 and a processor 47. The processor 47 is configured to use the transmitter 45 to transmit to the mobile communication network 1 a request to connect to the home area network 5, use the receiver 43 to receive an address from a range of addresses used in the home area network 5 from the mobile communication network 1, and use the transmitter 45 to transmit data destined for the home area network 5 to the mobile communication network 1. The data comprises the received address as source address.

The residential gateway 61 comprises a receiver 63, a transmitter 65 and a processor 67. The processor 67 is configured to use the receiver 63 to receive a request for an address for a client device 41 in the home area network 5 and for a range of addresses allocated to the home area network 5 and use the transmitter 65 to transmit a response to the request. The response comprises the address and the range of addresses. The processor 67 is further configured to use the receiver 63 and the transmitter 65 to establish a tunnel with the mobile communication data network 1 and use the at least one receiver 63 to receive data for the home area network 5 from the client device 41 via the tunnel. In the embodiment of FIG. 1, the processor 67 is configured to receive the address request from the SMF 21 in the mobile communication network 1 via the AAP 31 in the fixed line network 3 and receive a tunnel request from the SMF 21 in the mobile communication network 1 via the HAF 33 in the fixed line network 3.

Thus, a tunnel is established between the mobile communication network 1 and the residential gateway 61 and traffic is split into home area destined traffic and Internet destined traffic in the mobile communication network 1. The SMF 21 manages the setup of the connection between the residential gateway 61 and the UPF 15, which serves the mobile device 41 in the mobile communication network 1, and the UPF 15 acts as traffic splitter for home area network traffic from Internet traffic inside the mobile communication network 1. In the registration database of the database server 17, the mobile device 41 and the residential gateway 61 are linked to each other for authorization purposes. This will be explained later in the description.

In the embodiment shown in FIG. 1, the SMF 21 comprises one processor 27. In an alternative embodiment, the SMF 21 comprises multiple processors. The processor 27 of the SMF 21 may be a general-purpose processor, e.g. an Intel or an AMD processor, or an application-specific processor, for example. The processor 27 may comprise multiple cores, for example. The processor 27 may run a Unix-based or Windows operating system, for example. The receiver 23 and the transmitter 25 may use one or more cellular communication technologies such as GPRS, CDMA, UMTS, LTE and/or 5G RAN to communicate with mobile device 41, for example. The receiver 23 and the transmitter 25 may be combined in a transceiver. SMF 21 may comprise other components typical for a component in a (e.g. mobile) communication network, e.g. a power supply.

In the embodiment shown in FIG. 1, the SMF 21 comprises one device. In an alternative embodiment, the SMF 21 comprises multiple devices. In the embodiment shown in FIG. 1, the system of the invention only performs the Session Management Function. In an alternative embodiment, the system of the invention performs other functions in addition to the Session Management Function, e.g. the system comprises both the SMF 21 and the database server 17. In the embodiment shown in FIG. 1, the invention is realized as part of the Session Management Function. In an alternative embodiment, the invention is realized as part of one or more other functions of a mobile communication network, e.g. if the mobile communication network does not use a Session Management Function or uses the Session Management Function differently. In the embodiment shown in FIG. 1, the system of the invention is part of a 5G mobile communication network. In an alternative embodiment, the system of the invention is part of another type of mobile communication network. For example, the invention may be realized in a 4G mobile communication network as part of a Serving/PDN Gateway Control Plane (S/PGw-C) having the SMF functionality and the Home Subscriber Server (HSS) having the DB functionality. Furthermore, the Serving/PDN Gateway User Plane (S/PGw-U) will act as a traffic splitter for the home area network traffic from Internet traffic inside the mobile communication network.

In the embodiment shown in FIG. 1, the mobile device 41 comprises one processor 47. In an alternative embodiment, the mobile device 41 comprises multiple processors. The receiver 43 and the transmitter 45 of the mobile device 41 may use one or more cellular communication technologies such as GPRS, CDMA, UMTS, LTE and/or 5G RAN to communicate with the gNodeB-D 11, for example. The receiver 43 and the transmitter 45 may be combined in a transceiver. The processor 47 may be a general-purpose processor, e.g. an ARM processor, or an application-specific processor. The processor 47 may run Google Android or Apple iOS as operating system, for example. The mobile device 41 may comprise other components typical for a mobile device, e.g. a display and a battery. The mobile device 41 may be a mobile phone, for example. In another embodiment, the client device of the invention may be a device other than a mobile device.

In the embodiment shown in FIG. 1, the residential gateway 61 comprises one processor 67. In an alternative embodiment, the residential gateway 61 comprises multiple processors. The receiver 63 and the transmitter 65 of the residential gateway 61 may use one or more wireless communication technologies such as Wi-Fi (IEEE 802.11) to communicate with the mobile device 41, for example. The receiver 63 and the transmitter 65 of the residential gateway 61 may use one or more wired communication technologies to communicate with the fixed line network 3, for example. The receiver 63 and the transmitter 65 may be combined in a transceiver. The processor 67 may be a general-purpose processor, e.g. an ARM processor, or an application-specific processor. The processor 67 may run a Unix-based operating system, for example. The residential gateway 61 may comprise other components typical for a consumer network device, e.g. a power supply.

In the embodiment of the system of FIG. 1, the SMF 21 obtains an identifier of a residential gateway associated with the identifier of the mobile device 41 from the database server 17. In the embodiment of the system of FIG. 2, the SMF 28 obtains from a first database server 18 an identifier of a fixed line network that is associated with the identifier of the mobile device 41, and from which the identifiers of the fixed line network HAF and AAP can be derived via a Domain Name System (DNS) query. This allows the SMF 28 to contact the HAF 33 responsible for the mobile device 41. The HAF 33 then obtains an identifier of a residential gateway associated with the identifier of the mobile device 41 from a second database server 37, which allows the HAF 33 to contact the residential gateway 61 to establish the tunnel. This also allows the SMF 28 to contact the AAP 32 responsible for the mobile device 41. The AAP 32 then obtains the identifier of the residential gateway associated with the identifier of the mobile device 41 from the second database server 37, which allows the AAP 32 to contact the residential gateway 61 to obtain the address and address range.

In another embodiment, the AAP may be configured as an address assignment proxy for a designated home access Data Network Name (DNN) in the SMF. Then the SMF sends the identifier of the mobile device to the AAP which then gets the residential gateway identifier from the second database. Another way to get the identifier of the residential gateway associated with the identifier of the mobile device is from a local AAP database. In another embodiment of the system, the AAP is a sub-function of the HAF, so the SMF only needs to contact the HAF which then both performs tunnel establishment and acts as address assignment proxy (i.e. the HAF obtains the address and address range from the residential gateway).

Figure 2:
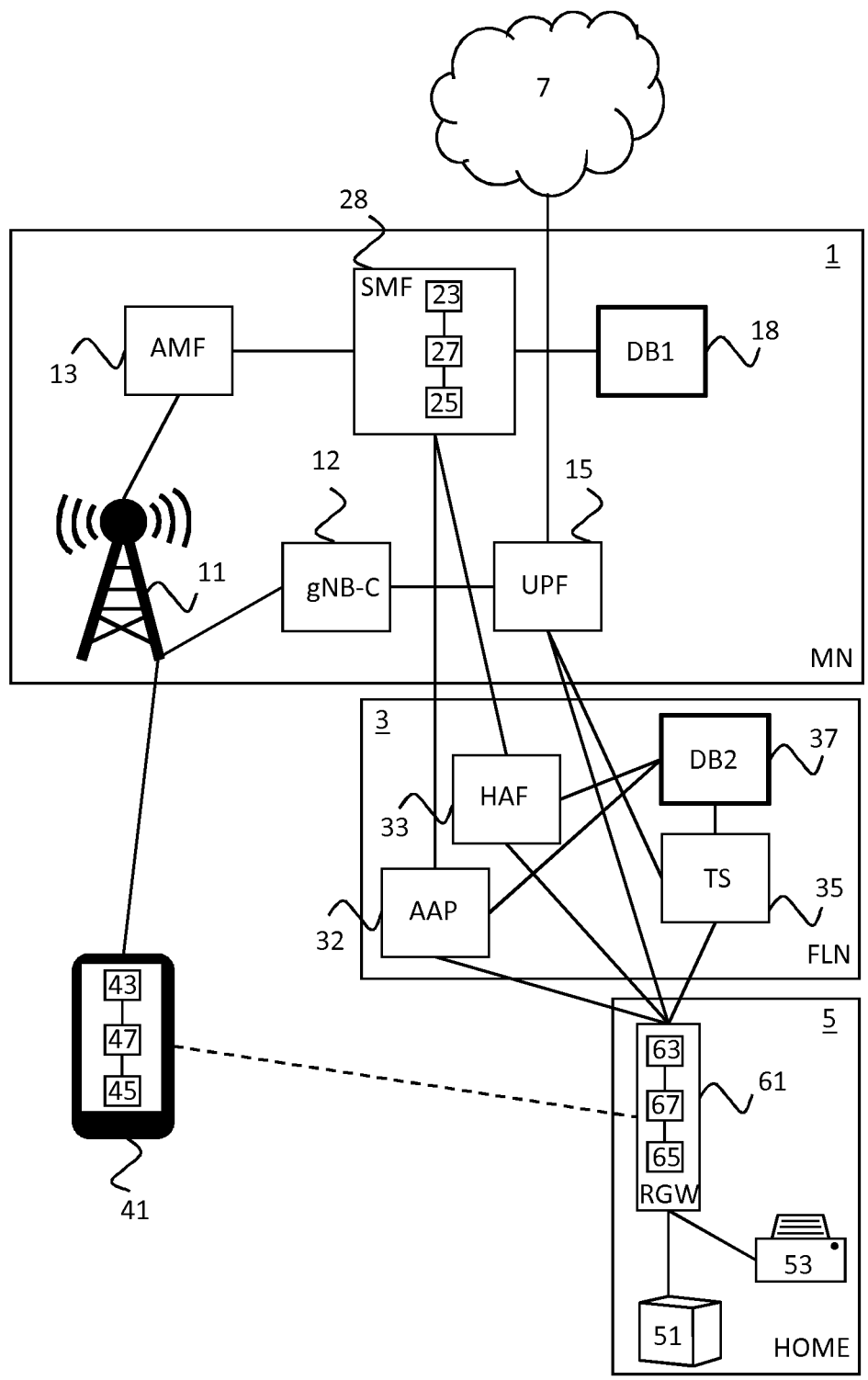
FIG. 2 is a block diagram showing a second embodiment of the system of the invention.

In the embodiment of FIG. 2, the SMF 28 obtains an address and address range from the fixed line network 3, i.e. from AAP 32. In the embodiment of the system of FIG. 1, the SMF 21 obtains an address and address range from the residential gateway 61 via AAP 31 in the fixed line network 3. In the embodiment of the system of FIG. 3, the SMF 29 obtains an address and address range from the residential gateway 61 via AAP 19 in the mobile communication network 1. The AAP 19 determines the address of the residential gateway 61 based on the identifier of the residential gateway 61 obtained from the database server 17.

Figure 3:
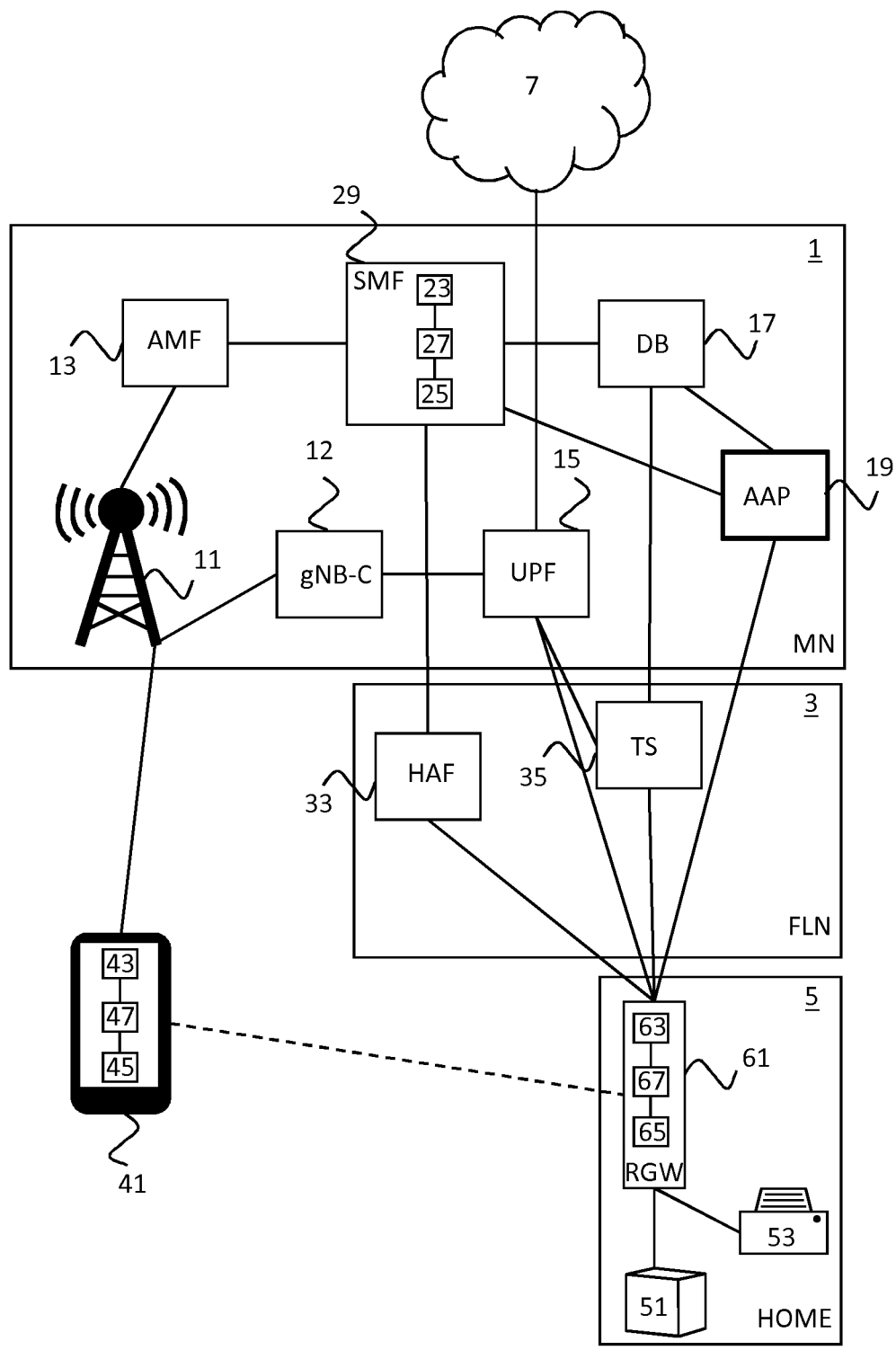
FIG. 3 is a block diagram showing a third embodiment of the system of the invention.
Figure 4:
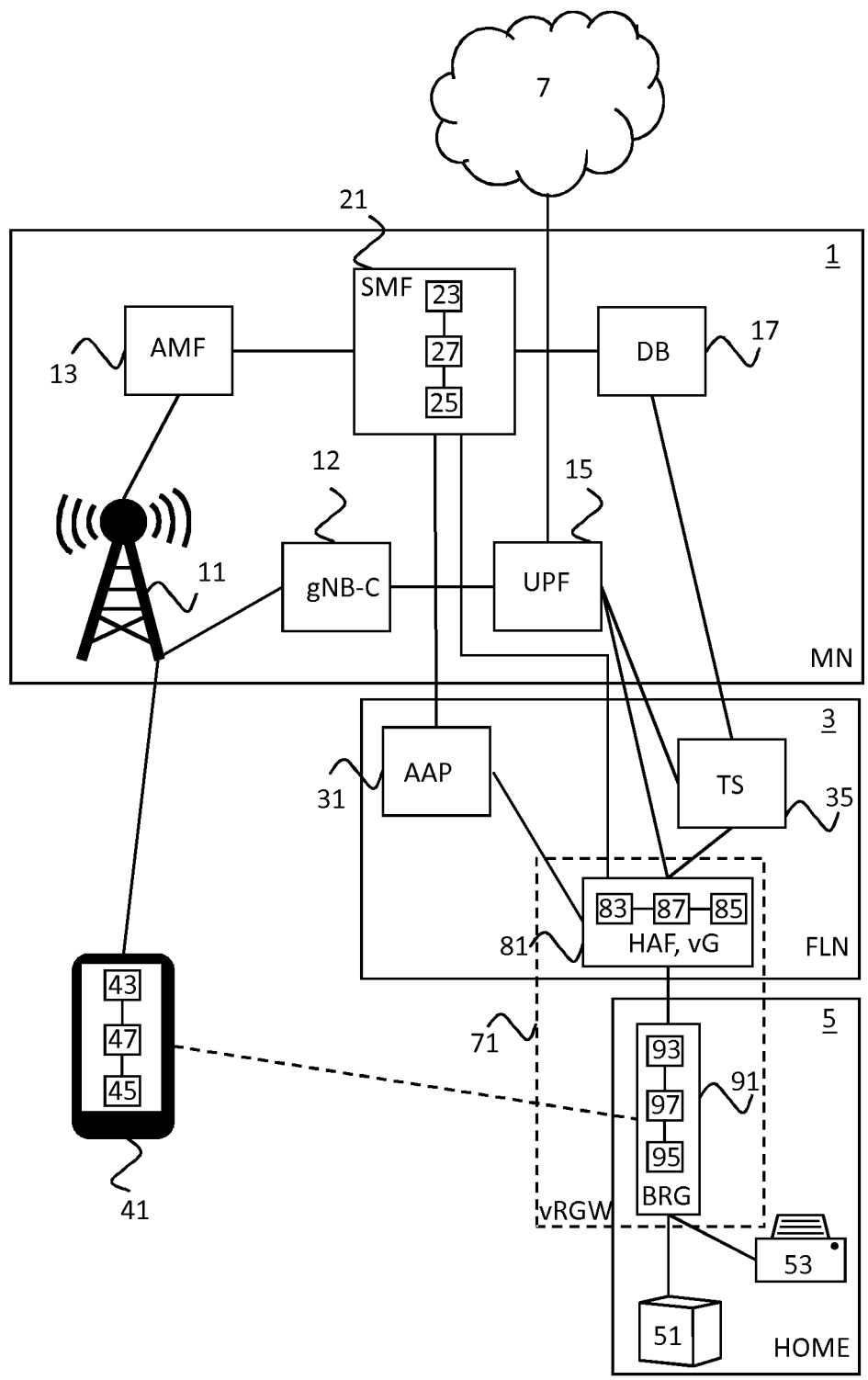
FIG. 4 is a block diagram showing a second embodiment of the residential gateway of the invention.

In the embodiment of FIGS. 1-3, the residential gateway 61 comprises a single device. In the embodiment of FIG. 4, the residential gateway 71 comprises a virtual function where services are hosted in the fixed line network domain instead of in the home area network domain. The virtual residential gateway 71 follows the control/user plane split as specified in Broadband Forum TR-317 "Network Enhanced Residential Gateway", and the vRGw 71 is split into a Bridged Residential Gateway (BRG) 91 and a virtual Gateway (vG) 81.

In the embodiment of FIG. 4, the HAF functionality has also been implemented in the vRGw 71. The address assignment may then be performed piggybacked on the tunnel establishment procedure, as described above in relation to the embodiment in which the AAP is a sub-function of the HAF. In the embodiment of FIG. 4, the vRGw 71 comprises two receivers 83 and 93 instead of the single receiver 63 of residential gateway (RGw) 61, the vRGw comprises two transmitters 85 and 95 instead of the single transmitter 65 of RGw 61, and the vRGw comprises two processors 87 and 97 instead of the single processor 67 of RGw 61. In terms of function, the processors 87 and 97 of the vRGw 71 may be configured collectively in the same way as previously described in relation to the processor 67 of the RGw 61. In terms of hardware, the processor 97 is likely similar to the processor 67 of the RGw 61, and the processor 87, which is a network processor, is likely similar to the processor 27 of the SMF 21.

In the embodiments of FIGS. 1 to 4, the traffic is split into home destined or Internet destined traffic in the UPF 15. In an alternative embodiment, this traffic splitting can be performed in the gNB-C 12. In a similar way as the Local IP Access feature specified in 3GPP Technical Specification TS 23.401, the gNB-C 12 can have a gateway functionality and the tunneling of traffic between the mobile communication network 1 and the RGw 61/71 can be done between the collocated gateway of gNB-C 12 and the RGw 61/71.

Figure 5:
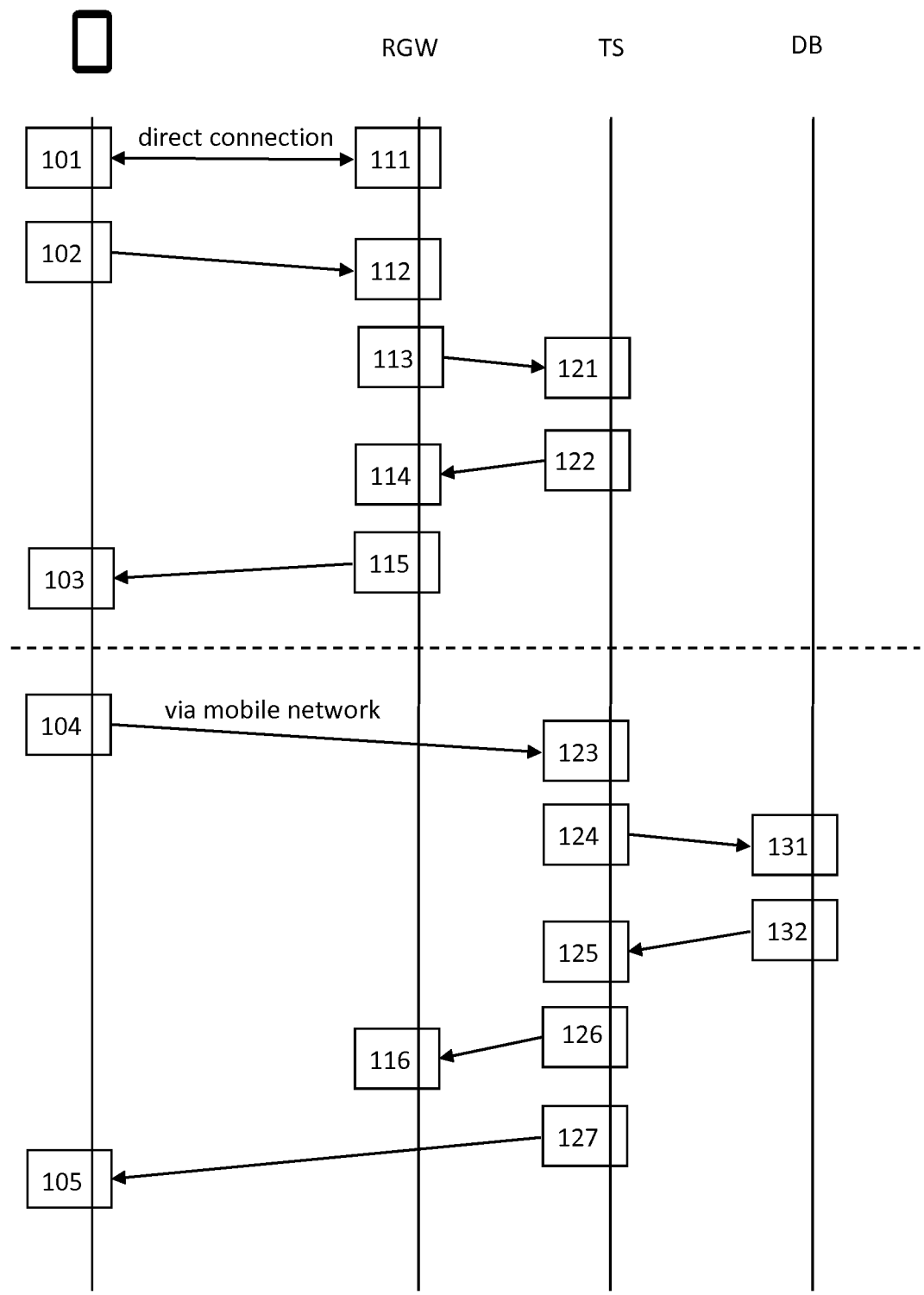
FIG. 5 is a first part of a flow diagram of embodiments of the methods of the invention.
Figure 6:
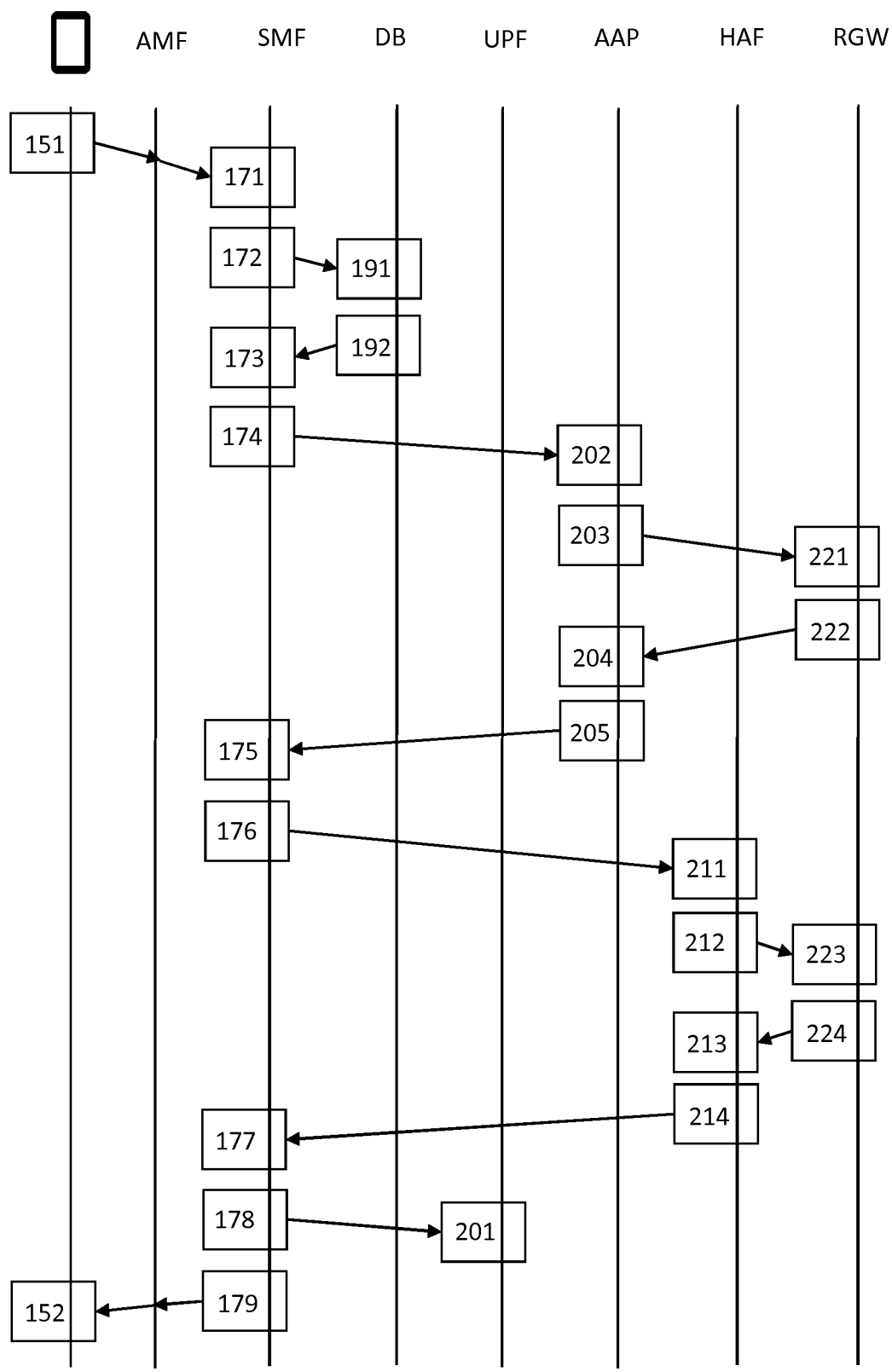
FIG. 6 is a second part of the flow diagram of the embodiments of the methods of the invention of FIG. 5.
Figure 7:
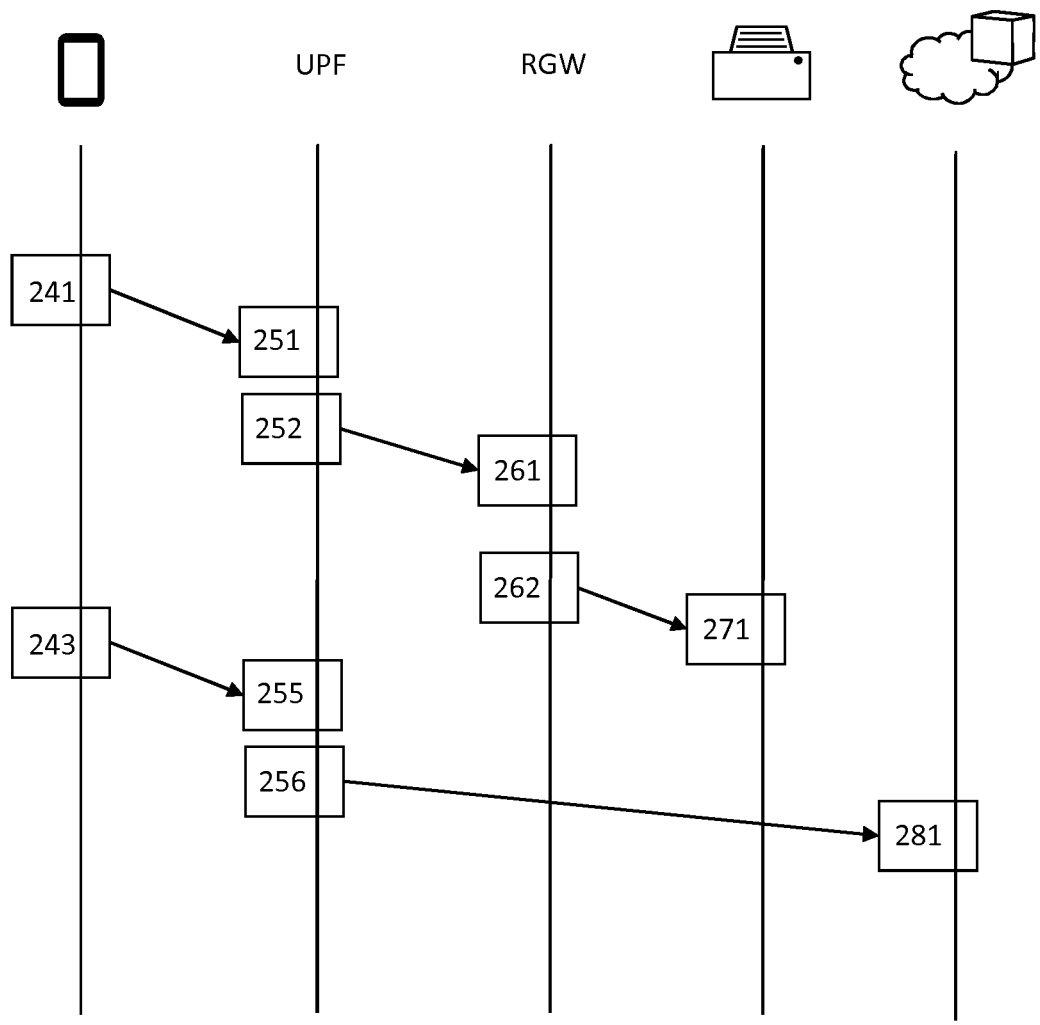
FIG. 7 is a third part of the flow diagram of the embodiments of the methods of the invention of FIGS. 5 and 6.

FIGS. 5-7 shows three parts of a flow diagram of embodiments of the methods of the invention. As mentioned in relation to FIG. 1, a tunnel is established between the mobile communication network 1 and the residential gateway 61 and traffic is split into home area network destined traffic and Internet destined traffic in the mobile communication network 1. The establishment of the tunnel is part of a first phase. In this first phase, the mobile device 41 is provided with an (e.g. IP) address and a data path splitting rule is inserted in the UPF 15. An embodiment of phase 1 is depicted in FIG. 6. The splitting of traffic is part of a second phase in which data is forwarded. An embodiment of phase 2 is depicted in FIG. 7. Before a tunnel can be established, a certain precondition needs to be met: the mobile device 41 needs to be associated with the residential gateway 61. This is referred to as the registration or provisioning phase.

The purpose of this registration/provisioning phase is to link a UE and a RGw together in such a way that for a specific UE, e.g. mobile device 41, its home area residential gateway identifier can be found. One way to do this is by provisioning the RGw(s) in a database (DB) 17 as subscription details and in the UE so that when the UE asks for a connection this information is retrieved from the database 17. Another way to do this is that the residential gateway and UE could self-provision through a number of steps. One advantage of self-provisioning is that no human interaction is needed from the owner of the residential gateway with the operator network. Another advantage of self-provisioning is that the UE and the RGw can agree a secret which they can use for authentication when setting up the connection and securing the communication. An embodiment of a self-provisioning phase is depicted in FIG. 5.

In steps 101 and 111, the mobile device 41 and the residential gateway 61 establish a direct connection, e.g. a Wi-Fi connection. The mobile device 41 connects directly from within the home area network 5 to the residential gateway 61. In step 102, the mobile device 41 transmits a message to the residential gateway 61 indicating that it would like to set up an association for home access through the mobile communication network 1. This message is transmitted via the direct connection. In step 112, the residential gateway 61 receives this message. In an alternative embodiment, steps 102 and 112 are omitted and in steps 101 and 111 the residential gateway 61 sets up an association for home access for each mobile device in the home area network 5.

In step 113, the residential gateway 61 requests an identification token from token server TS 35 in the fixed line network 3. In step 121, the token server 35 receives this request and returns a token in step 122. In step 114, the residential gateway receives this token and then forwards this token to the mobile device 41 in step 115. In step 103, the mobile device 41 receives this token from the residential gateway 61 via the direct connection.

In step 104, the mobile device 41 transmits to the token server 35 a request to register an association between the client device 41 and the residential gateway 61. This request is transmitted via the mobile communication network 1 and comprises the token received in step 103. In the embodiment of FIG. 5, step 104 comprises the mobile device 41 setting up an authenticated and encrypted channel with the token server 35, e.g. using GBA, and provides the token to the token server 35 over this authenticated and encrypted channel. GBA is specified in 3GPP TS 33.220. GBA is a standardized procedure that involves the mobile communication network, the fixed line network and the UE.

The token server 35 receives and recognizes the token in step 123 and stores an association between the identifier of the residential gateway 61 and the identifier of the mobile device 41 in the registration database. In the embodiment of FIG. 5, this registration database is stored on a database server 17 located in the mobile communication network 1. In step 124, the token server 35 transmits a request to store the association to the database server 17. In step 131, the database server 17 receives this request, determines the association from the request and stores the association in the database. In step 132, the database server 17 acknowledges to the token server 35 that it has stored the association. The token server 35 receives this acknowledgement in step 125.

In optional step 126, the token server 35 acknowledges the registration to the residential gateway 61 and gives it an identifier of the mobile device 41. In optional step 116, the residential gateway 61 receives this acknowledgement. In optional step 127, the token server 35 also acknowledges the registration to the mobile device 41. In this embodiment, the token server 35 provides the mobile device 41 with an identifier of the residential gateway in step 127. The mobile device 41 can include this identifier in its request to the mobile communication network 1 to connect to the home area network 5, as shown in FIG. 6. In an alternative embodiment, the token server 35 does not provide the mobile device 41 with an identifier of the residential gateway. In optional step 105, the mobile device 41 receives this acknowledgement, including the identifier. Optionally (not shown in FIG. 5), the residential gateway 61 and the mobile device 41 may agree a shared secret now, e.g. by means of a D-H key exchange. Both would then store the key together with the identifier. These acknowledgement steps 126, 116, 127 and 105 are not strictly necessary, but do allow the shared secret to be agreed upon. If steps 126, 116, 127 and 105 are omitted, the identifier of the residential gateway may be provided to the mobile device 41 in step 103.

In the embodiment of FIG. 5, the mobile device 41 sends the token before it sends a request for home area access to the mobile communication network. In an alternative embodiment, the mobile device 41 sends the token in its request for home area access to the mobile communication network. In this alternative embodiment, steps 104-105, step 116, steps 123-127 and steps 131-132 may be omitted in the self-provisioning phase. In a first implementation, this makes it unnecessary to link the UE and an RGw together in a registration database. In a second implementation, after having received the request for home area access from the mobile device 41, the SMF 21 first checks with the database server 17 whether the mobile device 41 is already linked with a/the residential gateway 61 and if not, steps 124, 131, 132, and 125 of FIG. 5 are performed between the SMF and the database server.

The data path setup phase is depicted in FIG. 6. The purpose of this phase is to setup the connection between the mobile device 41 and the RGw 61 based on the information that the mobile device 41 provides to the mobile communication network 1. After this phase, the connection should be up and running between the mobile device 41 and the RGw 61. As a precondition of this phase, the mobile device 41 should be connected to the mobile communication network 1 and the RGw 61 should be connected to the fixed line network 3.

Step 151 comprises the mobile device 41 transmitting to the mobile communication network 1 a request to connect to a home area network 5. In this embodiment, step 151 comprises the mobile device 41 sending a PDU Session Establishment Request to the AMF 13 containing an indication that home area network access is required for this session. This indication can be a new flag or a new information element in the existing PDU Session Establishment Request message specified in 3GPP TS 23.501. The AMF 13 forwards the message to the responsible SMF: SMF 21. Step 171 comprises the SMF 21 receiving the request.

In an alternative embodiment, the mobile device 41 does not send this indication to the AMF 13, but the SMF 21 is configured to provide home access for this mobile device 41 based on the provided Data Network Name, Network Slice Identification or subscription data. The benefit of this is that the operator can provide home access to UEs based on operator policy without the UE requesting it.

In the embodiment of FIG. 6, the PDU Session Establishment Request also comprises an identifier of the RGw 61 that the mobile device 41 needs to connect to. The PDU Session Establishment Request may further comprise a particular slice ID designated for Home Access for the particular fixed line operator or a particular Data Network Name (DNN).

Step 172 comprises the SMF 21 obtaining the identifier of the RGw 61 from a database which associates identifiers of client devices with identifiers of residential gateways. The SMF 21 requests the identifier (e.g. address) of the RGw 61 from the database server 17 storing the registration database, e.g. an UDM. In the embodiment of FIG. 6, it is the identifier (e.g. address) of the RGw 61 that is stored in the registration database of the database server 17 and it is this identifier that is sent to the SMF 21.

In an alternative embodiment, the SMF 21 retrieves the identifier(s), e.g. address(es), of the Home Access Function(s) (HAFs) that are registered in the registration database as those that can handle this subscriber's connection to his fixed line network. In this alternative embodiment, the association between the identifier of the RGw 61 and the identifier of the mobile device 41 may be stored on a further database server in the fixed line network 3, as described in relation to FIG. 2.

Step 191 comprises the database server 17 receiving the request from the SMF 21 and step 192 comprises the database server 17 responding to the request of the SMF 21 with the identifier of the RGw 61. Step 173 comprises the SMF 21 determining from the response the identifier of the residential gateway 61 in the home area network 5.

Step 174 comprises the SMF 21 transmitting a request for an address (e.g. IP address) and a range of addresses (e.g. IP addresses) in the home area network 5 to the RGw 61 via the AAP 31. The address request comprises the RGw identifier determined in step 173. The AAP 31 may be preconfigured as a separate address assignment server for a specific Data Network Name (DNN) and/or Slice ID in the SMF 21. In FIG. 1, the AAP 31 is implemented as a separate device from the HAF 33. In an alternative embodiment, the AAP functionality is implemented/collocated in the HAF 33.

In a different embodiment, an identifier of the HAF 33 was obtained instead of an identifier of the RGw 61 and the address request transmitted to the AAP comprises a UE identifier and a HAF identifier. The AAP may act like a DHCP proxy server, using DHCP option fields for transferring the UE and HAF identifiers and based on these identifiers finding the appropriate RGw to request an address. This AAP may be located in the mobile communication network 1, for example.

In the embodiment of FIG. 6, steps 172 and 173 comprise checking in the database whether an identifier of the mobile device 41 is associated with the identifier of the RGw 61 as received in step 171 from the mobile device 41, and step 174, i.e. transmitting the request for the address and the range of addresses, is performed in dependence on the identifier of the mobile device 41 being associated with the identifier of the RGw 61. If the mobile device 41 is not associated with the RGw 61 identified by the mobile device 41, the steps after step 173 are not performed. Instead the mobile device 41 is informed that it was not possible or allowed to establish a connection with the identified residential gateway. In an alternative embodiment, in steps 172 and 173, the SMF only checks whether the UE is authorized for home access, but not whether it is associated with the RGw. The association is then verified in step 211 by the HAF.

In an alternative embodiment, after the RGw receives a request from the AAP 31 for a home area network subnet address for the mobile device 41 (i.e. after step 221), the RGw 61 itself may also check itself whether it wants to allow the mobile device 41 to have access to the home area network. This may be done purely based on the UE ID like IMSI or based on the token negotiation in the precondition phase, for example. In case the RGw 61 would like to authenticate the mobile device 41, it sends a UE Authentication Request to AAP 31, which sends it to the mobile device 41 via the SMF 21.

The UE Authentication Request contains a challenge and optionally a token as known from the state-of-the-art. For example, EAP AKA' may be used. Mobile device 41 may verify the authentication token and if valid, the mobile device 41 responds with a UE Authentication Response. The mobile device 41 sends this message to the RGw 61 via the SMF 21 and the AAP 31. The UE Authentication Response contains the RES as known from the state-of-the-art. The mobile device 41 and the RGw 61 have now authenticated each other and agreed a session key as per EAP AKA'.

Step 202 comprises the AAP 31 receiving the request for an address for mobile device 41 in the home area network 5 and for a range of addresses allocated to the home area network 5. The AAP 31 then forwards this request to the RGw 61 in step 203. Step 221 comprises the RGw 61 receiving this request. Step 222 comprises the RGw 61 transmitting a response to the request. The RGw 61 determines an address and makes sure this address is unique in the home area network subnet. The response comprises the address and the home area network subnet. Step 204 comprises the AAP 31 receiving this response. In step 205, the AAP 31 responds to the address assignment request from the SMF 21 with the address and range of addresses that it received from the RGw 61. The SMF 21 receives this address and this range of addresses in step 175.

Steps 176, 211, 212, 223, 224, 213, 214 and 177 comprise the SMF 21 and the RGw 61 establishing a tunnel between the mobile communication network 1 and the residential gateway 66. In step 176, the SMF 21 sends a request to the HAF 33 in order to establish a tunnel between the RGw 61 and the UPF 15 serving the UE. This request contains the UE ID, RGw ID and the tunnel identifier on the side of the UPF. This may be a 5G Tunneling Protocol Identifier (5TP), a GPRS Tunneling Protocol (GTP) Identifier, a Generic Routing Encapsulation (GRE) Identifier, for example.

The HAF 33 receives this request in step 211 and forwards this request to the RGw 61 in step 212. The RGw 61 receives this request in step 223 and establishes the tunnel on its side. In step 224, the RGw 61 responds to this request with a tunnel identifier on its side which is according to the same tunneling technology on the UPF side, i.e. 5TP ID, GTP ID, etc. The HAF 33 receives this response in step 213 and forwards this response to the SMF 21 in step 214. Step 177 comprises the SMF 21 receiving the tunnel identifier relating to the established tunnel. In FIG. 6, the tunnel is established after the address and address range have been obtained. In an alternative embodiment, the tunnel is established before or at the same time the address and address range are obtained.

Steps 178 and 201 comprises the SMF 21 establishing a forwarding rule at the UPF 15. The forwarding rule includes the tunnel identifier received in step 177 and the range of addresses received in step 175 and ensures that data received from the mobile device 41 associated with the tunnel identifier and destined for a destination address in the range of addresses is forwarded to the RGw 61 through the tunnel.

Thus, as soon as the RGw-UPF tunnel is established, the SMF 21 inserts a traffic splitting rule in the UPF 15 which forwards the traffic destined to the home area network into the established tunnel while keeping all other traffic forwarded to the Internet. In case the home area network subnet is a type of address not routable via the Internet, the SMF 21 also inserts a Network Address Translation (NAT) rule using the 5TP tunnel endpoint identifier. In case of IP addresses, this NAT rule preferably matches on Source, 5TP->public IP, because it is likely that many RGws will hand out IP addresses in the same private ranges and traditional NATting will therefore not work.

Step 179 comprises the SMF 21 transmitting the address received in step 174 to the mobile device 41 via the AMF 13. The SMF 21 responds to the mobile device 41 that the requested PDU session is established. Step 152 comprises the mobile device 41 receiving the response, including the address, from the SMF 41. Optionally, in order to set up a secure tunnel between the mobile device 41 and the RGw 61, e.g. as an additional security layer, the mobile device 41 may send the capabilities of the mobile device 41 to the RGw 61 (e.g. TLS 1.0, TLS 1.1, TLS 1.2). The RGw 61 may compare this with its own list of capabilities (TLS 1.1, TLS 1.2) and pick the highest one (TLS 1.2). The RGw 61 sends this back to the mobile device 41 using a Secure Command Mode complete message after which ciphering starts. These last steps are not shown in FIG. 6.

In case the mobile device 41 and RGw 61 have gone through the dynamic (self) provisioning phase, they could run an authentication and key agreement according to the state of the art. It is also possible to piggy back the authentication and key agreement on the session setup protocol for example in a way that the mobile device 41 sends a challenge and authentication token in the PDU Session Request and receives the response from the SMF 21. The result of such a state-of-the-art authentication and key agreement is that the mobile device 41 and the RGw 61 agree a shared session key and have authenticated each other. An advantage of performing this step is that traffic between the mobile device 41 and the RGw 61 can be protected using for example IPSec using the session key. This step would also mitigate the attack where the mobile device 41 maliciously tries multiple RGw IDs to connect to.

The data forwarding and termination phase is depicted in FIG. 7. This phase is the actual usage phase of the invention. In this phase, the mobile device 41, UPF 15 and RGw 61 work together to forward traffic related to the home area network between the mobile device 41 and the RGw 61.

Step 241 comprises the mobile device 41 transmitting data destined for the home area network to the mobile communication network 1. The data comprises the address received in step 152 of FIG. 6 as source address. Step 251 comprises the UPF 15 receiving the data. Based on the rule inserted in the UPF 15 in step 201 of FIG. 6 and the destination address included in the data, the UPF 15 determines that the data is destined for the home area network 5 and decides to forward the data to RGw 61 via the established tunnel in step 252. Step 261 comprises the RGw 61 receiving the data. Step 262 comprises the RGw 61 forwarding the data to its destination in the home area network 5: printer 53. Step 271 comprises the printer 53 receiving the data.

Step 243 comprises the mobile device 41 transmitting data destined for (a device on) the Internet to the mobile communication network 1. Step 255 comprises the UPF 15 receiving the data. Based on the rule inserted in the UPF 15 in step 201 of FIG. 6 and the destination address included in the data, the UPF 15 determines that the data is not destined for the home area network 5 and decides to forward the data to the Internet 7 in step 256. If the source address included in the data is a private address, this private address is replaced with a public address in step 256. Step 281 comprises the data arriving at a destination device on the Internet 7.

When the mobile device 41 needs access to multiple home area networks, it does so by establishing multiple PDU Sessions with each one having access to one of the needed home area networks.

Figure 8:
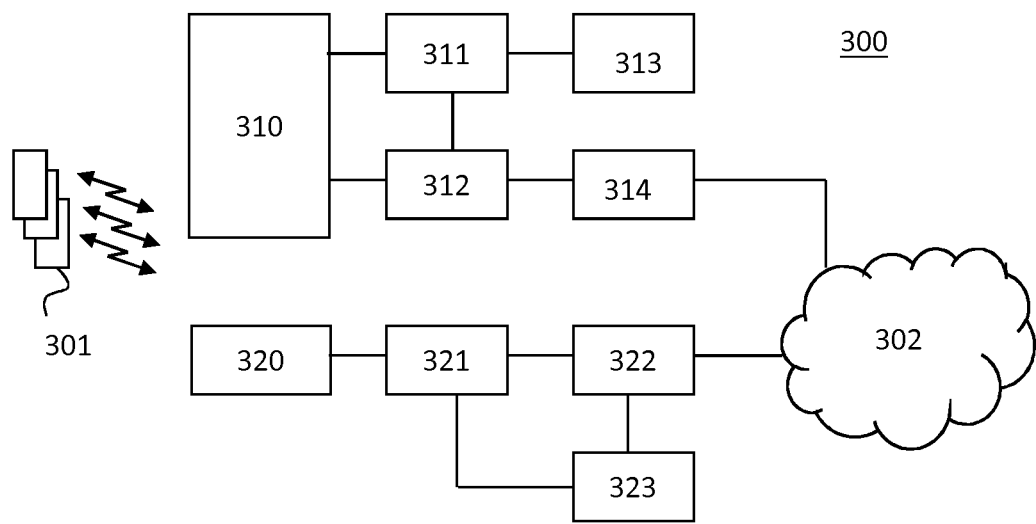
FIG. 8 is a block diagram of an exemplary cellular telecommunication system in which the system of the invention may be included.

In the telecommunications system 300 of FIG. 8, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 8 represents a GSM/GPRS or UMTS network.

For a GSM/GPRS network, a radio access network (RAN) system 320 comprises a plurality of nodes, including base stations (combination of a BSC and a BTS), not shown individually in FIG. 8. The core network system comprises a Gateway GPRS Support Node 322 (GGSN), a Serving GPRS Support Node 321 (SGSN, for GPRS) or Mobile Switching Centre (MSC, for GSM, not shown in FIG. 8) and a Home Location Register 323 (HLR). The HLR 323 contains subscription information for user devices 301, e.g. mobile stations MS.

For a UMTS radio access network (UTRAN), the radio access network system 320 also comprises a Radio Network Controller (RNC) connected to a plurality of base stations (NodeBs), also not shown individually in FIG. 8. In the core network system, the GGSN 322 and the SGSN 321/MSC are connected to the HLR 323 that contains subscription information of the user devices 301, e.g. user equipment UE.

The upper branch of the telecommunications system in FIG. 8 represents a 4G network, commonly indicated as Long Term Evolution (LTE) system or Evolved Packet System (EPS).

The radio access network system 310 (E-UTRAN) of the EPS, comprises base stations (evolved NodeBs, eNodeBs or eNBs), not shown individually in FIG. 8, providing cellular wireless access for a user device 301, e.g. user equipment UE. The core network system comprises a PDN Gateway (P-GW) 314 and a Serving Gateway 312 (S-GW). The E-UTRAN 310 of the EPS is connected to the S-GW 312 via a packet network. The S-GW 312 is connected to a Home Subscriber Server HSS 213 and a Mobility Management Entity MME 311 for signaling purposes. The HSS 313 includes a Subscription Profile Repository SPR for user devices 301.

For GPRS, UMTS and LTE systems, the core network system is generally connected to a further packet network 302, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 9:
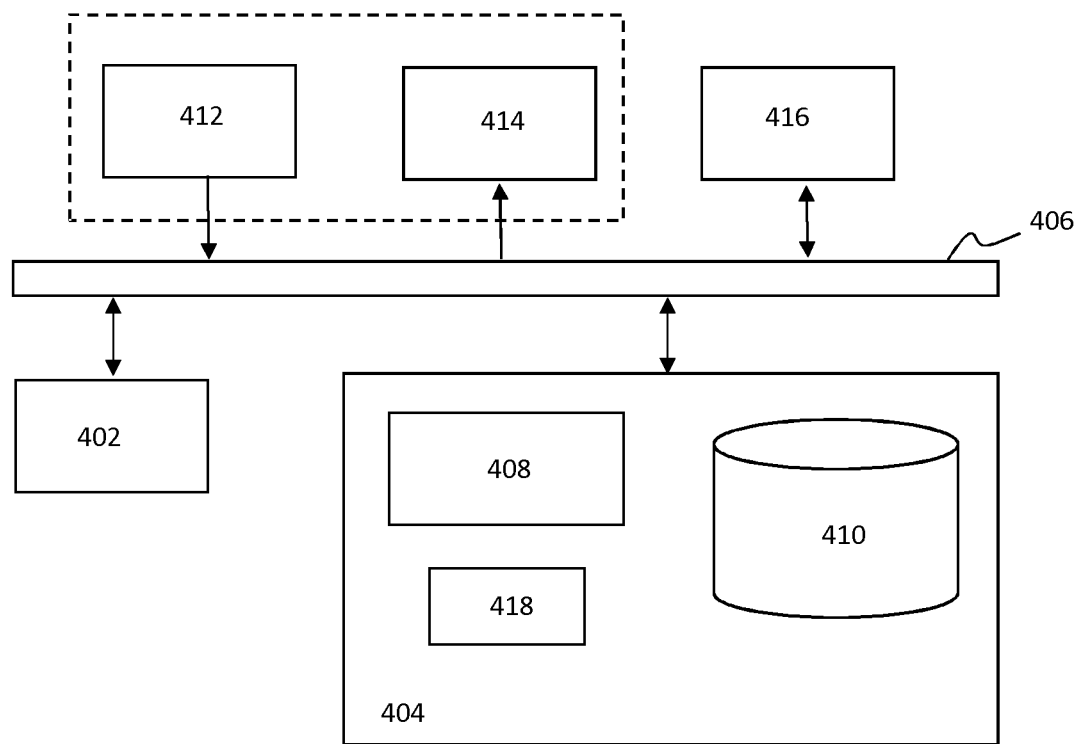
FIG. 9 is a block diagram of an exemplary data processing system for performing the methods of the invention.

FIG. 9 depicts a block diagram illustrating an exemplary data processing system that may perform the method as described with reference to FIGS. 2 to 7.

As shown in FIG. 9, the data processing system 400 may include at least one processor 402 coupled to memory elements 404 through a system bus 406. As such, the data processing system may store program code within memory elements 404. Further, the processor 402 may execute the program code accessed from the memory elements 404 via a system bus 406. In one aspect, the data processing system may be implemented as a computer that is suitable for storing and/or executing program code. It should be appreciated, however, that the data processing system 400 may be implemented in the form of any system including a processor and a memory that is capable of performing the functions described within this specification.

The memory elements 404 may include one or more physical memory devices such as, for example, local memory 408 and one or more bulk storage devices 410. The local memory may refer to random access memory or other non-persistent memory device(s) generally used during actual execution of the program code. A bulk storage device may be implemented as a hard drive or other persistent data storage device. The processing system 400 may also include one or more cache memories (not shown) that provide temporary storage of at least some program code in order to reduce the number of times program code must be retrieved from the bulk storage device 410 during execution.

Input/output (I/O) devices depicted as an input device 412 and an output device 414 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 412 and the output device 414). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 416 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 400, and a data transmitter for transmitting data from the data processing system 400 to said systems, devices and/or networks. Modems, cable modems, and Ethernet cards are examples of different types of network adapter that may be used with the data processing system 400.

As pictured in FIG. 9, the memory elements 404 may store an application 418. In various embodiments, the application 418 may be stored in the local memory 408, he one or more bulk storage devices 410, or separate from the local memory and the bulk storage devices. It should be appreciated that the data processing system 400 may further execute an operating system (not shown in FIG. 9) that can facilitate execution of the application 418. The application 418, being implemented in the form of executable program code, can be executed by the data processing system 400, e.g., by the processor 402. Responsive to executing the application, the data processing system 400 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 402 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for use in a mobile communication network, the system comprising:
    at least one receiver;
    at least one transmitter; and
    at least one processor configured to:
        use the at least one receiver to receive from a client device located in the mobile communication network a request to connect to a local area network, wherein the client device is separate from the system,
        determine an identifier of a home gateway in the local area network or of a fixed-line network to which the local area network is coupled,
        use the at least one transmitter to transmit, to the home gateway or the fixed-line network corresponding to the determined identifier, a request for an address for the client device and for a range of addresses in the local area network,
        use the at least one receiver to receive the address and the range of addresses from the home gateway or the fixed-line network,
        use the at least one transmitter to transmit the address to the client device,
        after receiving the address for the client device and the range of addresses from the home gateway or the fixed-line network, use the at least one receiver and the at least one transmitter to establish a tunnel between the system and the home gateway, and
        use the at least one transmitter to establish a destination-based forwarding rule at a forwarding function of the mobile communication network, the destination-based forwarding rule including the range of addresses and ensuring that data received from the client device in the mobile communication network and destined for a destination address in the range of addresses is forwarded to the home gateway through the tunnel while keeping all other data forwarded to the Internet.

2. The system as claimed in claim 1, wherein the address is a private address and the forwarding rule ensures that the forwarding function replaces the address in the received data with a public address before transmitting the data to a destination address outside the range of addresses.

3. The system as claimed in claim 1, wherein the at least one processor is further configured to obtain the identifier of the home gateway from a database which associates identifiers of client devices with identifiers of home gateways.

4. The system as claimed in claim 3, wherein the at least one processor is further configured to use the at least one receiver to receive an identifier of the home gateway from the client device, check whether an identifier of the client device is associated with the identifier of the home gateway in the database and transmit the request for the address and the range of addresses in dependence on the identifier of the client device being associated with the identifier of the home gateway.

5. The system as claimed in claim 3, wherein the at least one processor is further configured to determine an association between an identifier of the client device and the identifier of the home gateway based on information received from a network server and store the association in the database before receiving the request to connect to the local area network from the client device.

6. The system of claim 1, wherein the home gateway is configured as a single device, or as multiple devices.

7. A client device comprising:
    at least one receiver;
    at least one transmitter; and
    at least one processor configured to:
        use the at least one transmitter to transmit to a mobile communication network a request to connect to a local area network, wherein the request to connect to the local area network causes a tunnel to be established between the mobile communication network and the local area network after the mobile communication network receives an address for the client device and a range of addresses from the local area network, wherein the client device is separate from the mobile communication network, and wherein a destination-based forwarding rule is established at a forwarding function of the mobile communication network, the destination-based forwarding rule including the range of addresses and ensuring that data received from the client device in the mobile communication network and destined for a destination address in the range of addresses is forwarded to the local area network through the tunnel while keeping all other data forwarded to the Internet,
        use the at least one receiver to receive the address from the range of addresses used in the local area network from the mobile communication network, and
        use the at least one transmitter to transmit data destined for the local area network to the mobile communication network, the data comprising the received address as source address.

8. The client device as claimed in claim 7, wherein the at least one processor is further configured to connect directly from within the local area network to a home gateway, receive a token from the home gateway and transmit to a network server a further request to register an association between the client device and the home gateway before transmitting the request to the mobile communication network, the further request comprising the token.

9. The client device as claimed in claim 8, wherein the at least one processor is further configured to use the at least one receiver to receive an identifier of the home gateway from the network server in response to the further request and include the identifier of the home gateway in the request before transmitting the request.

10. A home gateway for use in a local area network, the home gateway comprising:
at least one receiver;
at least one transmitter; and
at least one processor configured to:
use the at least one receiver to receive a request for an address for a client device in the local area network and for a range of addresses allocated to the local area network, to enable the client device in a mobile communication network to connect to the local area network, wherein the client device is separate from the mobile communication network,
use the at least one transmitter to transmit a response to the request, the response comprising the address and the range of addresses,
after transmitting the response, use the at least one receiver and the at least one transmitter to establish a tunnel between the home gateway in the local area network and the mobile communication network, wherein a destination-based forwarding rule is established at a forwarding function of the mobile communication network, the destination-based forwarding rule including the range of addresses and ensuring that data received from the client device in the mobile communication network and destined for a destination address in the range of addresses is forwarded to the home gateway through the tunnel while keeping all other data forwarded to the Internet, and
use the at least one receiver to receive data for the local area network from the client device via the tunnel.

11. The home gateway as claimed in claim 10, wherein the at least one processor is further configured to obtain a token and provide the token to the client device when the client device is directly connected from within the local area network.

12. The home gateway of claim 10, wherein the home gateway is configured as a single device, or as multiple devices.

13. A method of receiving a request to connect to a local area network, the method comprising:
at a system in a mobile communication network, receiving from a client device located in the mobile communication network a request to connect to a local area network, wherein the client device is separate from the system;
determining an identifier of a home gateway in the local area network or of a fixed-line network to which the local area network is coupled;
transmitting, to the home gateway of the fixed-line network corresponding to the determined identifier, a request for an address for the client device and for a range of addresses in the local area network;
receiving the address and the range of addresses from the home gateway or the fixed-line network;
transmitting the address to the client device;
after receiving the address for the client device and the range of addresses from the home gateway of the fixed-line network, establishing a tunnel between the system and the home gateway; and
establishing a destination-based forwarding rule at a forwarding function of the mobile communication network, the destination-based forwarding rule including the range of addresses and ensuring that data received from the client device in the mobile communication network and destined for a destination address in the range of addresses is forwarded to the home gateway through the tunnel while keeping all other data forwarded to the Internet.

14. A method for a client device to request to connect to a local area network, the method comprising:
transmitting to a mobile communication network a request to connect to a local area network, wherein the request to connect to the local area network causes a tunnel to be established between the mobile communication network and the local area network after the mobile communication network receives an address for the client device and a range of addresses from the local area network, wherein the client device is separate from the mobile communication network, and wherein a destination-based forwarding rule is established at a forwarding function of the mobile communication network, the destination-based forwarding rule including the range of addresses and ensuring that data received from the client device in the mobile communication network and destined for a destination address in the range of addresses is forwarded to the local area network through the tunnel while keeping all other data forwarded to the Internet;
receiving the address from the range of addresses used in the local area network from the mobile communication network; and
transmitting data destined for the local area network to the mobile communication network, the data comprising the received address as source address.

15. A method of establishing a connection with a local area network, the method comprising:
in the local area network, receiving a request for an address for a client device in the local area network and for a range of addresses allocated to the local area network, to enable the client device in a mobile communication network to connect to the local area network, wherein the client device is separate from the mobile communication network;
from the local area network, transmitting a response to the request, the response comprising the address and the range of addresses;
after transmitting the response, establishing a tunnel between the local area network and the mobile communication network, wherein a destination-based forwarding rule is established at a forwarding function of the mobile communication network, the destination-based forwarding rule including the range of addresses and ensuring that data received from the client device in the mobile communication network and destined for a destination address in the range of addresses is forwarded to the local area network through the tunnel while keeping all other data forwarded to the Internet; and
receiving data for the local area network from the client device via the tunnel.

16. A non-transitory computer-readable medium having instructions stored thereon that, when executed by one or more processors of a computing device in a mobile communication network, cause the computing device to carry out operations including:
- at the computing device, receiving from a client device located in the mobile communication network a request to connect to a local area network, wherein the client device is separate from the system;
- determining an identifier of a home gateway in the local area network or of a fixed-line network to which the local area network is coupled;
- transmitting, to the home gateway or the fixed-line network corresponding to the determined identifier, a request for an address for the client device and for a range of addresses in the local area network;
- receiving the address and the range of addresses from the home gateway or the fixed-line network;
- transmitting the address to the client device;
- after receiving the address for the client device and the range of addresses from the home gateway of the fixed-line network, establishing a tunnel between the computing device and the home gateway; and
- establishing a destination-based forwarding rule at a forwarding function of the mobile communication network, the destination-based forwarding rule including the range of addresses and ensuring that data received from the client device in the mobile communication network and destined for a destination address in the range of addresses is forwarded to the home gateway through the tunnel while keeping all other data forwarded to the Internet.

17. A non-transitory computer-readable medium having instructions stored thereon that, when executed by one or more processors of a computing device, cause the computing device to carry out operations including:
- transmitting to a mobile communication network a request to connect to a local area network, wherein the request to connect to the local area network causes a tunnel to be established between the mobile communication network and the local area network after the mobile communication network receives an address for the computing device and a range of addresses from the local area network, wherein the computing device is separate from the mobile communication network, and wherein a destination-based forwarding rule is established at a forwarding function of the mobile communication network, the destination-based forwarding rule including the range of addresses and ensuring that data received from the computing device in the mobile communication network and destined for a destination address in the range of addresses is forwarded to the local area network through the tunnel while keeping all other data forwarded to the Internet;
- receiving the address from the range of addresses used in the local area network from the mobile communication network; and
- transmitting data destined for the local area network to the mobile communication network, the data comprising the received address as source address.

18. A non-transitory computer-readable medium having instructions stored thereon that, when executed by one or more processors of a computing device in a local area network, cause the computing device to carry out operations including:
- in the local area network, receiving a request for an address for a client device in the local area network and for a range of addresses allocated to the local area network, to enable the client device in a mobile communication network to connect to the local area network, wherein the client device is separate from the mobile communication network;
- from the local area network, transmitting a response to the request, the response comprising the address and the range of addresses;
- after transmitting the response, establishing a tunnel between the local area network and the mobile communication network, wherein a destination-based forwarding rule is established at a forwarding function of the mobile communication network, the destination-based forwarding rule including the range of addresses and ensuring that data received from the client device in the mobile communication network and destined for a destination address in the range of addresses is forwarded to the local area network through the tunnel while keeping all other data forwarded to the Internet; and
- receiving data for the local area network from the client device via the tunnel.

* * * * *